United States Patent [19]

Whittenberger

[11] Patent Number: 4,928,485
[45] Date of Patent: May 29, 1990

[54] METALLIC CORE MEMBER FOR CATALYTIC CONVERTER AND CATALYTIC CONVERTER CONTAINING SAME

[75] Inventor: William A. Whittenberger, Garrettsville, Ohio

[73] Assignee: W. R. Grace & Co.,-Conn., New York, N.Y.

[21] Appl. No.: 362,089

[22] Filed: Jun. 6, 1989

[51] Int. Cl.⁵ .............................................. F01N 3/28
[52] U.S. Cl. ...................................... 60/299; 60/300; 422/180; 502/527
[58] Field of Search .................. 60/299, 300; 422/180; 502/527

[56] References Cited

U.S. PATENT DOCUMENTS

| | | |
|---|---|---|
| 3,768,982 | 10/1973 | Kitzner et al. |
| 3,770,389 | 10/1973 | Kitzner et al. |
| 3,857,680 | 12/1974 | Porta ................................. 502/527 |
| 4,382,323 | 5/1983 | Chapman ........................... 422/180 |
| 4,414,023 | 11/1983 | Aggen et al. ........................ 75/124 |
| 4,711,009 | 12/1987 | Cornelison et al. .................. 29/157 |

Primary Examiner—Douglas Hart
Attorney, Agent, or Firm—Edward J. Cabic

[57] ABSTRACT

There is provided a novel core member for use in a catalytic converter characterized by a corrugated non-nesting thin metal foil having a given length and a given width, which strip is overfolded to provide portions of about equal length. Along the fold line is attached a wire or rod, as, for example, by welding. The wire containing ends are gathered and secured to form a central core. This core may by spirally wound to fit within a peripheral housing, and the free ends of the core members secured to the housing, as by welding. This assembly may be used in a catalytic converter and may be equipped to be electrically heated from a battery using the resistance of the corrugated thin metal strip portions to effect heating thereof.

16 Claims, 2 Drawing Sheets

METALLIC CORE MEMBER FOR CATALYTIC CONVERTER AND CATALYTIC CONVERTER CONTAINING SAME

This invention relates, as indicated, to a metal core member useful in fabricating a catalytic converter, and to a catalytic converter module containing a plurality of such core members. In a more specific aspect, this invention relates to an electrically heatable catalytic converter module which is especially useful as a device for converting a substantial portion of the pollutants emanating from an internal combustion engine as exhaust gas, to harmless environmentally acceptable materials suitable for discharge to the atmosphere.

BACKGROUND OF THE INVENTION AND PRIOR ART

The conventional catalytic converter for internal combustion engine exhaust utilizes a polycelluler ceramic monolith core on the cell surfaces of which is deposited a catalyst which aids in the conversion of pollutants contained in the exhaust, such as, carbon monoxide, nitrogen oxides ($NO_x$), unburned hydrocarbons, etc. to carbon dioxide, nitrogen, and water. More recently, catalytic converters have been formed of metal which are less expensive and easier to manufacture. The latter may be electrically heated to elevate the temperature of the catalyst prior to contact with "cold exhaust" at start-up to effect substantial removal of pollutants which would otherwise escape to the atmosphere until the catalyst achieved a temperature, e.g., 500 to 700 degrees F., sufficient to promote oxidation or, in some cases, reduction of pollutant materials.

Catalytic converters formed of corrugated thin metal strips are known. See U.S. Pat. No. 4,711,009 to Richard C. Cornelison et al, dated 8 Dec. 1987 the disclosure of which is incorporated herein by reference. Electrically heated catalytic converters are also known. See the U.S. Pat. Nos. To Kitzner 3,768,982 and 3,770,389 each dated 30 Oct. 1973. The present invention is concerned with an improved structure for fabricating a catalytic converter body of corrugated thin metal strips and which converters are readily adapted to be electrically heatable. A process for corrugating, coating and applying catalyst to thin metal strips is disclosed in the aforesaid U.S. Pat. No. 4,711,009. The improved structure utilizes a corrugated thin metal (preferably a stainless steel) strip which is overfolded once (as distinct from accordion folded) and wherein a metal bar or rod of circular, square, rectangular or other polygonal cross-sectional configuration is secured, e.g. welded, to the overfolded strip along the fold line to form a core member. The member bar or rod has a length greater than the width of the metal strip and thus projects from at least one side of the overfolded member, and desirably projects from each side. A plurality of such core members are gathered together, and a binder, e.g., a ring or rings placed about the projecting end or ends so that the rods or bars form a central core with the balance of the thin metal strips extending outwardly therefrom. This assembly is then enclosed in a peripheral housing member, e.g., a ring or an oval. Desirably, the housing has an internal dimension (or dimensions) from the central core to peripheral housing less than the normal radial extension of the core portions whereby the core members may be compressed into a more nearly uniform cell density across the gas intercepting face. In the case of a ring-form housing, it has an internal diameter measured from the central circular core which is less than the unflexed extension of the core member portions. Thus, in the case of a ring or circular housing so dimensioned, it is convenient to wind spirally the assembly of core members about the central core to fit within the housing. It is also convenient to weld tabs fastened to or integral with the free ends of the corrugated thin metal strip portions directly to the housing. A voltage source, e.g., a 12 volt battery, may be attached, one pole to the central core, and the other to the housing to enable electrical heating of the converter body. The foregoing assembly is then placed in a suitable housing for insertion in the exhaust line from an internal combustion engine.

BRIEF STATEMENT OF THE INVENTION

Briefly stated, the present invention is a core member useful in fabricating a catalytic converter module, and comprising a strip of corrugated thin metal foil having a predetermined length and a predetermined width. This strip is overfolded once to provide corrugated thin metal portions of approximately equal length. A rod, bar or wire having a length equal to or greater than the predetermined width of the thin metal foil strip is then secured, e.g., by welding, along the fold line of said overfolded strip, and in the preferred case, projects bilaterally from the folded strip. The thin metal strip is corrugated in a manner such that when it is overfolded, the corrugations of one portion will not nest in the corrugations of the other portion and thus block the easy passage of exhaust gas between the portions. A chevron or herringbone corrugation pattern is nonnesting as between overfolded portions and preserves the cellular structure of the device.

This invention also contemplates an electrically heatable polycellular catalytic module for a catalytic converter wherein one pole of a voltage source is connected to the central core, and the other pole of the voltage source is connected either directly or indirectly to the housing. The cell density of the openings in the gas intercepting face of the catalytic module is in the range of from 50 to 700, preferably 100 to 300, cells per square inch.

BRIEF DESCRIPTION OF THE DRAWINGS

The invention may be better understood by having reference to the annexed drawings wherein there is shown a preferred embodiment of the invention and in which drawings.

DETAILED DESCRIPTION OF THE DRAWINGS

The present invention provides a novel and improved structure for making a catalytic converter. This device can be used under any circumstances where it is desired to effect a catalytic chemical reaction, especially one in a gas phase, by catalytic conversion or interaction of compounds contained in the gas phase, e.g., pollutants such as, carbon monoxide, nitrogen oxides, unburned hydrocarbons, to a different gas composition, e.g., one containing environmentally acceptable proportions of the original pollutants and the conversion products thereof, e.g., carbon dioxide, nitrogen, and water. The modular structure hereof is relatively easy to make and thus is less expensive in material and labor costs. The principal utility of the modular structures hereof is in the fabrication of catalytic converters for automotive vehicles as well as for stationary engines powered by internal combustion engines. The exhaust from such devices generally contains pollutants, such as those listed above, the concentration of which in the exhaust gas must be substantially reduced in order to be environmentally acceptable. The modules of the present invention are especially useful when embodied in an electrically heatable catalytic converter. Such devices can attain optimum initial operating temperature quickly and before the engine is started so as to further minimize atmospheric pollution arising from cold engine start-up.

Figure 1:
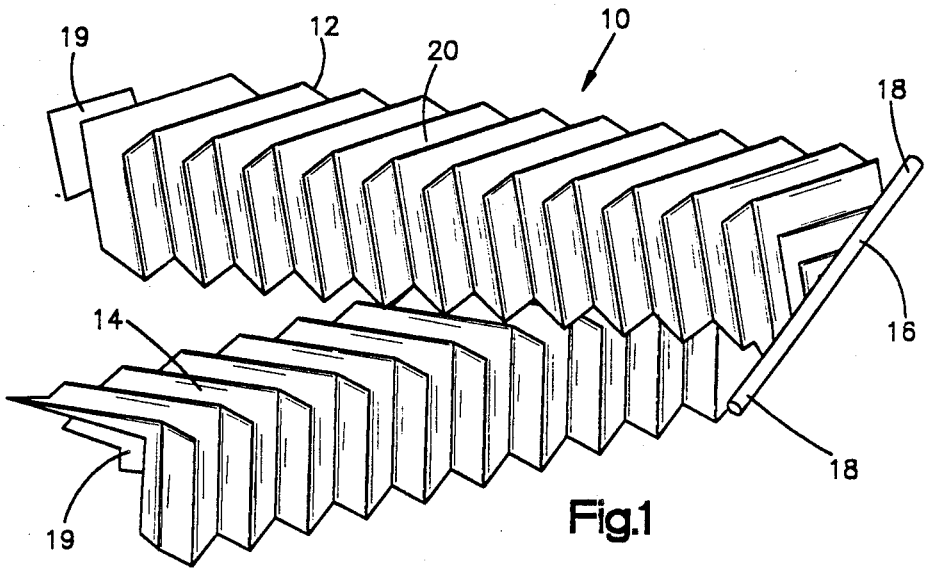
FIG. 1 is a perspective view of a core member in accordance herewith.

Referring now more particularly to the drawings, in FIG. 1 there is shown a core element 10 composed of an overfolded segment of corrugated, nonnesting, thin metal, e.g., stainless steel. The illustrated segment has a given length, e.g., 15 inches, and a given width, e.g., 1.5 inches. This segment is folded in half to provide segment portions 12 and 14 each having a length of 7.5 inches. The segment is conveniently cut from a continuously produced thin metal strip in accordance with a process such as described in the aforementioned U.S. Pat. No. 4,711,009. The strips may have different lengths depending upon the configuration of the peripheral housing. Along the fold line there is secured, as by welding, a metal wire or rod 16 having a small projection 18, about 1/16" to ⅛", from one or preferably both, edges of the foil strip. The free ends of the portions 12 and 14 are conveniently provided with tabs 19 for securing to a housing described below. The corrugations 20 are in a chevron or herringbone pattern which provides a nonnesting configuration when the portions 12 and 14 are overfolded. Several of these core elements are gathered together and shown in FIG. 2.

Figure 2A:
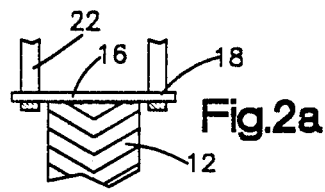
FIG. 2a is a fragmentary side view showing the positioning of a core member in spaced core rings.
Figure 2:
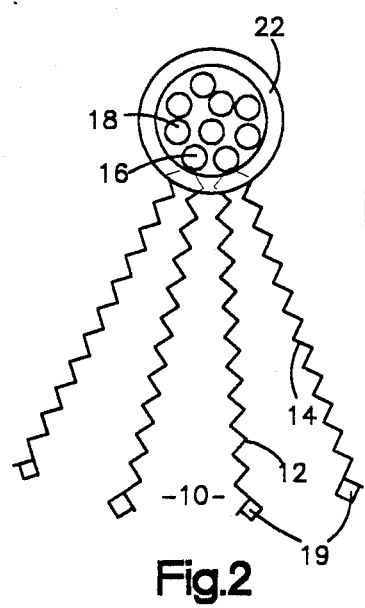
FIG. 2 is an end view of an assembly of core members such as shown in FIG. 1, gathered and retained by a central core ring.
Figure 5:
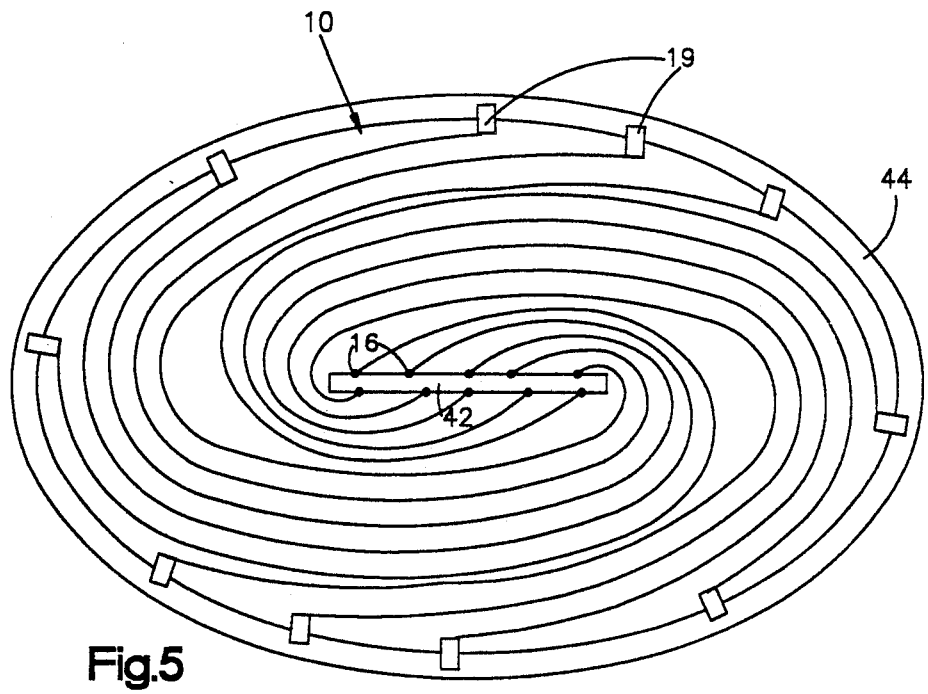
FIG. 5 is an end view of another form of catalytic converter module in accordance herewith.

The next stage in the assembly of a catalytic module is shown in FIGS. 2 and 2a wherein a plurality, for example nine, of the core elements 10 of FIG. 1. are collected, and the projections 18 of the wires or rods 16 bound within (preferable) or secured, as by welding, to the outside of a metallic core ring 22 or other such element (See FIG. 5.). It should be noted that the wire or rod 16 may be along either the outside of the fold line, as is preferred, or inside and between the proximal ends of the portions 12 and 14. Welding tabs 19 are shown at the distal extremities of the portions 12 and 14. The assembly of FIG. 2 is then ready for insertion into a peripheral housing, such as, for example, the circular housing shown in FIG. 3 or the oval housing as shown in FIG. 5.

Figure 3:
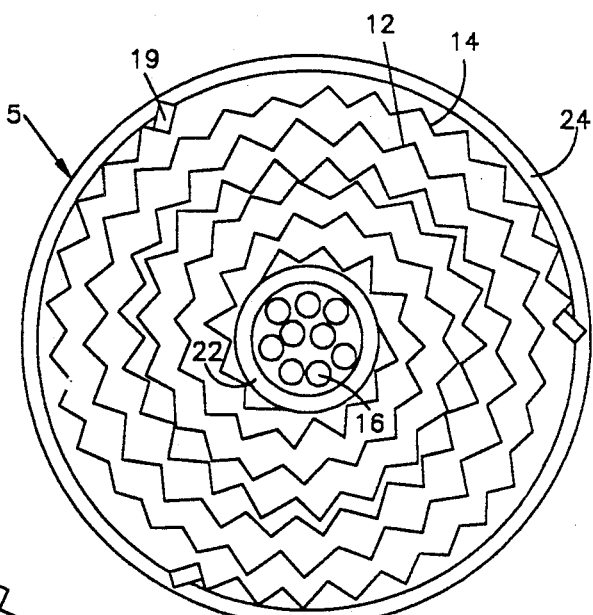
FIG. 3 is a end view of a catalytic converter module or element in accordance herewith showing a plurality of core members spirally wound about a central core and contained within a housing.

FIG. 3 shows a catalytic converter module or element generally indicated at 15 confined within a circular peripheral housing 24 (having a width of 1.5," for example) by spirally winding the assembly of FIG. 2 about the axis of the central core member 23 composed of the ring or rings 22 enclosing the wires or rods 16. The tabs 19, which may be integral with and formed from the thin metal strip material, are conveniently welded to the metallic (e.g., stainless steel) peripheral housing 24 to complete the basic catalytic core element 15, in this case having a circular configuration. This device may then be incorporated in a suitable catalytic housing adapted for insertion in an exhaust line, such as shown in FIG. 4, for example.

Figure 4:
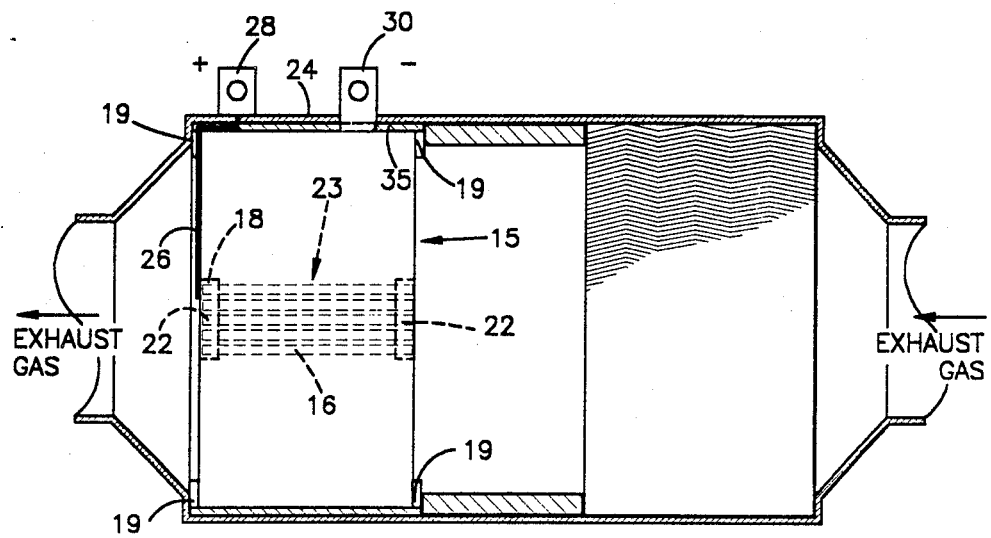
FIG. 4 is a cross-sectional view of an electrically heatable catalytic converter embodying a module in accordance herewith.

FIG. 4 shows in cross-section a catalytic converter having a metallic (e.g., stainless steel) envelope or housing 32 fitted with end cap adapters 34 and 36 for fitting to an exhaust line, not shown. The housing 32 has preferably at its downstream end (the gas flow being indicated by the arrows) a catalytic converter element 15 such as shown in FIG. 3. The catalytic element 15 may be located in the housing 32 at the upstream end if desired. The central core element 23 (FIG. 4) in the case of an electrically heatable catalytic converter, is conveniently connected by a conductor 26 to a positive terminal 28 which extends through the housing 32 with suitable insulation means 33. The module 15 may also be insulated from the housing 32 by a layer of insulating material 35 such as a ceramic fabric, e.g., Interam, a trademark of 3 M Company. A terminal 30 extending through the housing 32 and the insulation 35 is connected to the peripheral housing 24. In certain instances, it may be found desirable to use the exhaust system itself connected to the grounded chassis to provide the negative pole, and contact the housing 15 directly through the housing 32 to ground. The terminals 28 and 30 are in turn connected to a voltage source, e.g., an automobile 12 volt battery, not shown, through suitable switching and control means responsive to time or temperature as may be desired, also not shown, such means being within the ordinary skill of the art. The housing 32 is shown also with a second catalytic converter element 38 which is upstream of the catalytic converter element 15, and which need not be electrically heated. It is retained in axially spaced relation to the element 15 by a spacer ring 40 conveniently secured, as by welding, to the inside of the housing 32. The catalytic converter element 38 may be of ceramic as in conventional polycellular ceramic catalytic converters, or of layered, e.g., accordion folded corrugated thin metal foil, as described in U.S. Pat. No. 4,725,411 to Cornelison dated 16 Feb. 1988. As indicated above, the second catalytic converter element 38 may be located downstream of the catalytic converter element 15, if desired.

FIG. 5 shows another embodiment of the invention hereof which is adapted to fit inside an oval shaped housing. It is fabricated in essentially the same way as described above except that instead of a circular formed core member, the core member is a flat sheet of metal 42 to which the wires or rods 16 are secured, as by welding. Again the free ends of the overfolded portions 12 and 14 (FIG. 1) are at least partially spirally wound about the elongated central core member 42 and the tabs 19 secured, as by welding, to the peripheral housing 44, which in this case is oval in configuration. The lengths of the corrugated metal strips from which the core elements 10 are formed may be different where the distance from the central core to the peripheral housing varies as in the example of FIG. 5. The objective is to assure substantial filling of the open area of the housing about the central core with sufficient corrugated thin metal cells (formed by the contiguity of the corrugated portions 12 and 14 (FIG. 1)) that the cell density density from the core to the peripheral housing is within a varience, e.g., from 30 to 75 cells per square inch, across the gas intercepting face of the catalytic converter element. This assembly can then be encased in an oval catalytic converter housing, similar to the housing 32 (FIG. 4) to form a low profile or minimum ground clearance device, e.g. about 3.5" of the type commonly in use on current automobiles.

The devices of the present invention have a cellular or polycellular gas intercepting face characterized by a plurality of cell openings therein. The cell density in the gas intercepting face of the device is broadly from 50 to 700 cell openings per square inch, generally from 150 to 450 cells per square inch, and preferably from 175 to 300 cells per square inch. Cell density is a function of the shape, size and number of corrugations in the corrugated foil as well as the thickness of the foil. The open area in such a structure is generally from about 80% to about 92%.

The corrugation patterns are preferably sinusoidal in cross-section and have a herringbone pattern between the marginal edges of the thin metal strip. Other wave forms, e.g., triangular, etc. may be used. Generally, the corrugations have an amplitude of from about 0.02" to about 0.25" and a pitch or wave length of from about 0.02" to about 0.2". In the chevron pattern, the angle of deviation of the sides of the chevron from a line normal to the marginal edges of the thin metal strip is from about 3 degrees to about 10 degrees, i.e., the included angle defined by the sides of the chevron pattern is from about 160 degrees to about 174 degrees. The length of a side of the chevron is from about 0.75" to about 1.25". The chevron pattern is formed by passing the thin metal strip between corrugating gears from a leading edge to a trailing edge. The thin metal has a thickness of from about 0.001" to about 0.05", 0.002" being a preferred thickness.

The thin metal desirably has a thin coating of aluminum on the surfaces thereof, or contains aluminum as a part of the alloy composition (3.0% to 6% Al) as produced by the manufacturer. During heat treatment, this aluminum coating or alloy material is at least partially oxidized and converted to alumina, a desired catalyst support base. Such a catalyst support base may be applied by wash coating according to known procedures. Other refreactory metal oxides, or a mixture of two or more refractory metal oxides, can be used for this catalyst support base, e.g., silica, titania, zirconia, etc.

The preferred metal alloy for the corrugated metal strip is a ferritic stainless steel such as that described in U.S. Pat. No. 4,414,023 dated 8 Nov. 1983 to Aggen et al and containing about 20% chromium, 5% aluminum, 0.06% rare earth, balance iron and steel making impurities. Specific alloys consist essentially of 8.0% to 25.0% chromium, 3.0 to 8% aluminum, 0.002% to 0.05% of at least one rare earth metal selected from cerium, lanthanum, neodymium, and praseodymium, the total of rare earths being up to 0.060%, up to 4.0% silicon, 0.06 to 1.0% manganese and normal steel making impurities of less than 0.05% carbon, less than 0.050% nitrogen, less than 0.020% oxygen, less than 0.040% phosphorous, less than 0.030% sulfur, less than 0.50% copper, less than 1% nickel, the sum of magnesium and calcium being less than 0.005%, the remainder being iron. The desired procedure is to corrugate the metal strip and then apply a wash coat of alumina, or other metal oxide, according to a known procedure (see U.S. Pat. No. 4,711,009, supra). A catalyst for the oxidation or conversion of the pollutants above referred to may also be provided as taught in the above patent.

There has thus been provided a catalytic converter module which is characterized by simplicity of manufacture and which is adapted to be electrically heated, if desired.

What is claimed is:

1. A core member useful in a catalytic converter comprising:
   (a) a strip of corrugated nonnesting thin metal foil having a given length and a given width, said strip being folded to provide portions of about equal length; and
   (b) a wire secured along the fold line of said folded strip.

2. A core member in accordance with claim 1 wherein the wire has a length greater than the width of the thin metal foil.

3. A core member in accordance with claim 1 wherein the thin metal foil is corrugated in a herringbone or chevron pattern.

4. A core member in accordance with claim 1 wherein the metal is a stainless steel.

5. A core member in accordance with claim 1 wherein the corrugated thin metal foil is provided with a wash coat of at least one refractory metal oxide.

6. A core member in accordance with claim 5 wherein the refractory metal oxide coating has a catalyst deposited thereon.

7. A core member in accordance with claim 6 wherein the catalyst comprises a noble metal.

8. A core member in accordance with claim 6 wherein the noble metal is selected from the group consisting of palladium, platinum, rhodium, ruthenium and mixtures thereof.

9. A polycellular catalytic module for a catalytic converter comprising a plurality of core members as defined in claim 1, said core members being collected at their wire-containing ends; means for binding the ends of the wires to form a central core; a peripheral housing for compacting and retaining said core members; and means for securing the free ends of said core members to said peripheral housing.

10. A polycellular catalytic module as defined in claim 9 having a gas intercepting face and wherein the cell density at the gas intercepting face is from 50 to 700 cells per square inch.

11. A polycellular catalytic module as defined in claim 9 wherein the wires project from each side of the thin metal foil, and the means for binding the projecting ends of the wires is a metal ring.

12. A polycellular catalytic module as defined in claim 9 wherein the housing is a circular metallic member.

13. A polycellular catalytic module as defined in claim 9 wherein the means for securing each of the free ends of the core members to the housing is a tab formed at each of the free ends of the core members and said tab is welded to the housing.

14. A polycellular catalytic module as defined in claim 9 wherein the housing is a circular member, the distance from the central core to the inner surface of the housing is less than the lengths of the thin metal portions, and the core members are spirally wound about the central core.

15. A polycellular catalytic module as defined in claim 9 wherein the housing is oval and the distances from the central core to the inside of the peripheral housing are less than the lengths of the thin metal portions.

16. An electrically heatable polycellular catalytic module in accordance with claim 9 wherein one pole of a voltage source is connected to the central core, and the other pole of a voltage source is connected to the housing.

* * * * *